(12) United States Patent
Murdock

(10) Patent No.: US 6,388,259 B1
(45) Date of Patent: May 14, 2002

(54) RADIATION DETECTION METHOD AND APPARATUS

(75) Inventor: John K. Murdock, Woodlyn, PA (US)

(73) Assignee: The Boeing Company, Seattle, WA (US)

( * ) Notice: Subject to any disclaimer, the term of this patent is extended or adjusted under 35 U.S.C. 154(b) by 97 days.

(21) Appl. No.: 09/590,164

(22) Filed: Jun. 8, 2000

(51) Int. Cl.7 .................................................. G01T 1/00

(52) U.S. Cl. ............................... 250/370.01; 250/472.1

(58) Field of Search ................... 250/370.01, 370.02, 250/370.05, 370.07, 390.01, 391, 472.1, 473.1, 474.1

(56) References Cited

U.S. PATENT DOCUMENTS

| | | | |
|---|---|---|---|
| 4,110,621 A | | 8/1978 | Horn |
| 4,727,256 A | | 2/1988 | Kumazawa |
| 4,769,547 A | | 9/1988 | Uber, III |
| 4,880,981 A | | 11/1989 | Johnston |
| 4,983,843 A | * | 1/1991 | Thomson ............... 250/370.02 |
| 5,059,801 A | | 10/1991 | Burgess |
| 5,498,876 A | * | 3/1996 | Moscovitch ............. 250/474.1 |
| 5,821,540 A | | 10/1998 | Sato et al. |

OTHER PUBLICATIONS

Phillps et al, Investigation of 4D ORAM Materials as radiation detectors/dosimeters, Nuclear Science Symposium, Oct.–1999, Conference Rcord, pp. 734–737, vol. 2.*
Michael K. Gauthier and Armando R.V. Dantas, Radiation–Effects Testing For Space and Military Applications, *Test & Measurement World*, Feb. 1988, 5 pp.

Web page of antirad.com, Meter Conversions, Inc. Nuclear Radiation Monitors, Oct. 13, 1999, 12 pp.

\* cited by examiner

*Primary Examiner*—Ricky Mack
*Assistant Examiner*—Richard Hanig
(74) *Attorney, Agent, or Firm*—Alston & Bird LLP

(57) ABSTRACT

A radiation detection method and apparatus for detection of radiation in a small, portable, relatively inexpensive device. A radiation sensitive memory device and a radiation hardened memory device receive digital data from a digital data generator such as a pseudo-random word generator. The radiation sensitive memory device outputs an exposed digital data stream which, while stored in the radiation sensitive memory device, is susceptible to radiation incident upon the radiation sensitive memory device. The radiation hardened memory device is much less sensitive to radiation than the radiation sensitive memory device such that the test digital data stream output by the radiation hardened memory device is much less effected by radiation than the exposed digital data stream. The exposed digital data stream and the test digital data stream are compared to determine whether the exposed digital data stream was exposed to radiation while stored in the radiation sensitive memory device. Differences between the exposed digital data stream and the test digital data stream are generally indicative of exposure to radiation. Errors detected between the exposed digital data stream and the test digital data stream are measured per unit time and can be converted to a radiation exposure measurement. One or more pre-set radiation exposure measurement thresholds establish conditions at which alarms are activated in the event that the radiation exposure measurement exceeds one of the thresholds. The radiation exposure measurement can also be displayed, such as on an LCD display.

20 Claims, 2 Drawing Sheets

RADIATION DETECTION METHOD AND APPARATUS

FIELD OF THE INVENTION

The present invention relates to a radiation detection method and apparatus, and more particularly, a radiation detection method and apparatus which compares binary digital data that has been stored in and retrieved from a radiation sensitive memory device and a radiation hardened memory device to detect radiation exposure.

BACKGROUND OF THE INVENTION

Nuclear radiation, in sufficient quantities, is harmful to humans because it can destroy the genetic blueprint of our living cells. Such destruction can kill living cells, or can cause cells to mutate and multiply uncontrollably causing a cancer. There are three principal types of radiation: (1) charged particles such as alpha particles and beta particles; (2) uncharged particles or neutrons; and (3) photons or gamma rays which are emitted from nuclear reactors and the sun and stars. Exposure to minimal levels of radiation is largely unavoidable because radiation occurs naturally within the earth, traces of radioactive elements can make their way into our bodies, and inescapable cosmic rays from the sun and stars frequently strike the earth. However, some naturally occurring deposits and man-made radiation sources can cause harmful radiation exposure that should and can be avoided.

The U.S. Nuclear Regulatory Commission issues Federal Regulations defining levels of safe nuclear radiation. See Title 10 of the Code of Federal Regulations, Part 20 entitled "Standards for Protection against Radiation." In these standards, a unit of radiation absorbed dose is the rad which equals 0.01 Joule/kilogram. One rad is required to deposit 100 ergs/gram in any material by any kind of radiation.

Radiation can be harmful to biological organisms including humans. Radiation with sufficient energy to produce ions (ionizing radiation) is more damaging to humans than non-ionizing radiation. As such, exposure tolerance values for humans have been developed in terms of a rem which is a dose equivalent unit. The conversion factor from rad to rem is the RBE (relative biological effectiveness). Rem equals the product of RBE times rad where RBE varies from 1 for X-rays and gamma rays to 20 for 1 Mev alpha particles.

More particularly, the Exposure Tolerance Values for Humans (Whole-body radiation dose) is as follows along with explanatory comments:

| | |
|---|---|
| 0.0001 rem/day | Natural background radiation |
| 0.01 rem/day | Permissible dose range, est. in 1957 |
| 1 rem/day | Debilitation 3 to 6 months, death 3 to 6 years |
| 100 rem/day | Survivable emergency exposure dose |
| 150 rem/week | but permitting no further |
| 300 rem/month | exposure for life |
| 25 rem | Single emergency exposure |
| 100 rem | 20-year career allowance |
| 500 rem | maximum permissible 20-year career allowance |

In order to detect radiation, radiation detection devices must be utilized since radiation cannot be sensed by sight, smell, or taste. A commonly known radiation detector is the Geiger counter. It was first built by Hans Geiger around 1911. This device measures the conductivity in a gas filled vacuum tube called the Geiger-Mueller tube. The tube's conductivity increases with each radiation particle or high energy ray incident to the tube. The device's electronics count the number of conductive pulses incident upon the tube per unit time as a measure of the radiation level. Unfortunately, this device is relatively large and expensive since much equipment is required to manufacture the tube and a high voltage power supply, such as 800 to 1000 volts, is required to operate the tube. Thus, this radiation detection device is not practical for the average consumer, cannot be easily transported, and is relatively expensive.

Another common radiation detection device is a scintillation detector. This device employs a radiation sensitive material, such as a sodium iodide crystal, along with a photo-multiplier tube amplifier (PMT). The radiation sensitive material converts radiation into photons which are multiplied into a measurable current by the PMT. This device is also relatively large and expensive, and is therefore impractical for the average consumer. As such, affordable radiation detection devices are not generally available that can be conveniently carried by a person in order to warn the person of exposure to unsafe radiation levels.

SUMMARY OF THE INVENTION

The above needs are met and other advantages are achieved by the present invention, which provides a method and apparatus for detecting radiation based upon a comparison of digital data that is stored in both a radiation sensitive memory device and a radiation hardened memory device. As a result of its design, the radiation detection method and apparatus is relatively inexpensive and is sized so as to be conveniently carried throughout the day in order to provide immediate warning of radiation exposure.

According to the present invention, the radiation detector comprises a digital data generator for producing digital data. Preferably, the digital data generator is a pseudo-random generator, such as a pseudo-random word generator that produces pseudo-random words. This radiation detector also comprises a radiation sensitive memory device for storing at least a portion of the digital data produced by the digital data generator for a test period during which time the digital data may be susceptible to radiation, and thereafter producing an exposed digital data stream. The radiation detector further comprises a radiation hardened memory device for also storing at least a portion of the digital data produced by the digital data generator, and for producing a test digital data stream which is synchronized to the exposed digital data stream produced by the radiation sensitive memory device. As its name suggests, the radiation hardened memory device is much less sensitive to radiation than the radiation sensitive memory device. Nevertheless, both the radiation hardened memory device and the radiation sensitive memory device can be shift registers through which digital data is clocked or shifted. In one advantageous embodiment, the radiation sensitive memory device and the radiation hardened memory device store a pseudo-random word produced by the pseudo-random word generator. Further, the radiation detector includes a comparator for comparing the exposed digital data stream with the test digital data stream to determine any differences there between. Preferably, the radiation detector also includes a bit error rate counter for measuring a bit error rate between the exposed digital data stream and the test digital data stream based on the differences noted by the comparator.

The radiation detector can also include a controller that receives the bit error rate and processes the bit error rate into a radiation exposure measurement. The radiation detector may also have a display for displaying the radiation exposure measurement. Further, the radiation detector may include an alarm which activates when the radiation exposure measurement exceeds a pre-set radiation exposure measurement threshold. In addition, the radiation detector may further comprise a clock for controlling a rate at which the various components, including the digital data generator, the comparator and the bit error rate counter, operate.

The invention also encompasses a method for measuring radiation. The method of this embodiment for measuring radiation comprises the step of generating digital data, such as pseudo-random digital words. This method further comprises the step of storing at least a portion of the digital data in a radiation sensitive memory device for a test period during which time the digital data may be susceptible to radiation, and thereafter producing an exposed digital data stream. Also, this method encompasses the step of concurrently storing at least a portion of the digital data in a radiation hardened memory device and thereafter producing a test digital data stream which is synchronized to the exposed digital data stream produced by the radiation sensitive memory device. In one embodiment, for example, at least a portion of the digital data is clocked or shifted through respective shift registers that comprise the radiation sensitive memory device and the radiation hardened memory device. In addition, a pseudo-random digital word can be stored in both the radiation sensitive memory device and the radiation hardened memory device which thereafter output an exposed word and a test word, respectively. This method also includes the step of comparing the exposed digital data stream and the test digital data stream to determine any differences there between.

The comparison of the exposed digital data stream to the test digital data stream preferably determines an error rate which is then processed to produce a radiation exposure measurement. If desired, the radiation exposure measurement can be displayed and/or an alarm can be activated if the radiation measurement reaches a pre-set radiation exposure measurement threshold, thereby warning of the potential for exposure to undesirably high levels of radiation. As a result of its design, however, the radiation detector method and apparatus is relatively inexpensive and is small enough to be conveniently carried throughout the day in a shirt pocket, on a belt loop or the like. Alternatively, the radiation detector can have a form factor like a wristwatch and can simply be worn on the wrist.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
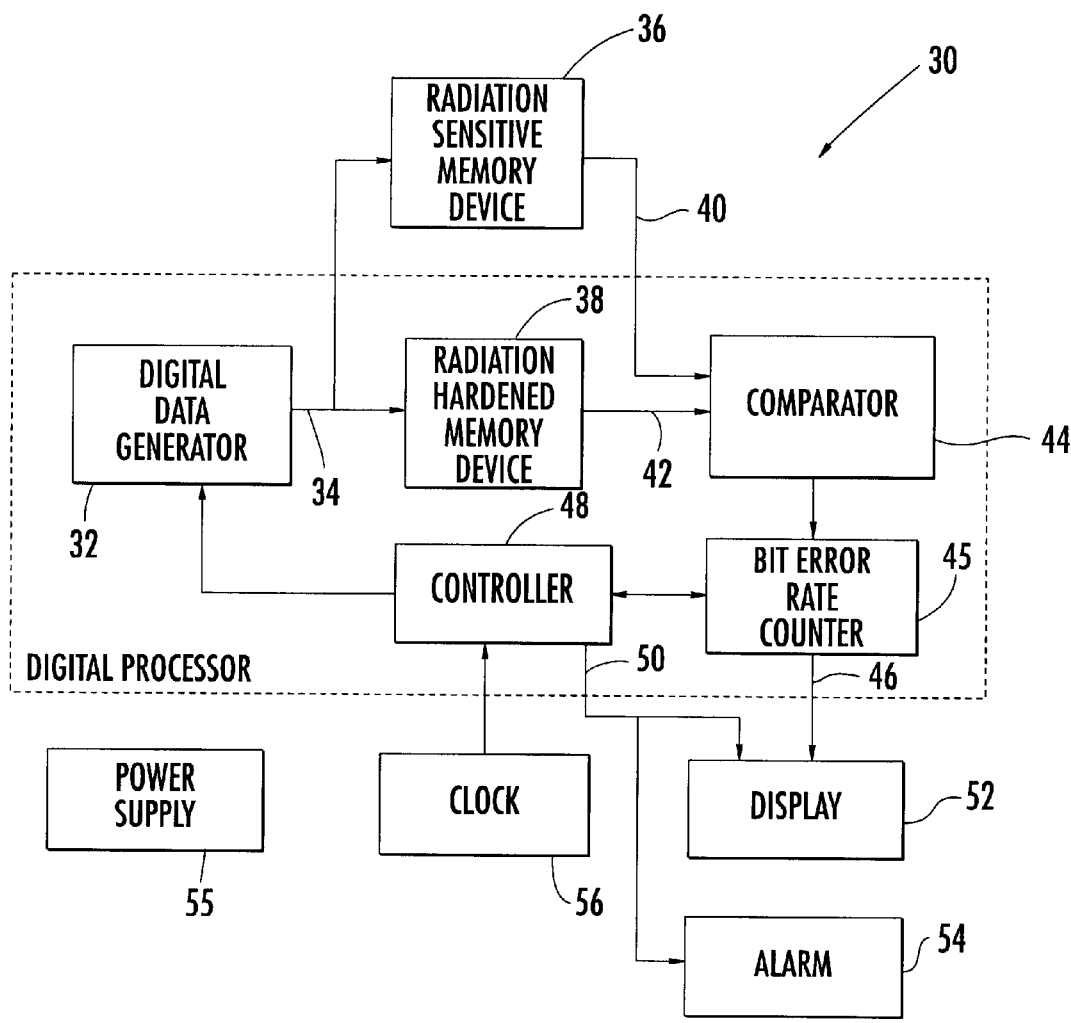
FIG. 1 is a schematic illustration of one embodiment of a radiation detector of the present invention.

FIG. 1 shows an embodiment of a radiation detector 30 according to the present invention in which radiation is detected by comparing digital data stored by a radiation sensitive memory device 36 and a radiation hardened memory device 38. Since the design of the radiation detector 30 is relatively inexpensive and lends itself to compact packaging and a lightweight assembly, the radiation detector 30 of the present invention is particularly well suited for personal use since the radiation detector may be conveniently carried in much the same fashion as a pager, i.e., in a pocket, on a belt loop or the like. Alternatively, the radiation detector can have a form factor like a wristwatch and can simply be worn on the wrist. However, the radiation detector 30 is not limited to a device for personal use. Rather, the radiation detector 30 can readily be adapted for use in industrial, medical, military, or other applications.

The radiation detector 30 includes a digital data generator 32 that outputs digital data 34. The digital data generator 32 is preferably a pseudo-random generator and, more preferably, a pseudo-random word generator that generates packets of pseudo-random digital words.

The digital data 34 is input to both a radiation sensitive memory device 36 and a radiation hardened memory device 38. Both memory devices 36, 38 can be selected to have the same memory capacity, although this feature is not necessary to the practice of the present invention. Moreover, in those advantageous embodiments that employ a pseudo-random word generator, the pseudo-random word generator can be designed to generate words having a size equal to that of the memory devices 36, 38, although the pseudo-random word generator can generate differently sized words, if desired. Preferably, the digital data 34 is input into both memory devices 36, 38 simultaneously and remains within both memory devices for the same length prior to being output by both memory devices 36, 38 at exactly the same time. By being stored by both memory devices 36, 38 for the same period of time, the radiation detector method and apparatus of the present invention can isolate and analyze the effects of radiation upon the digital data 34 in the manner described below.

Memory devices are typically comprised of a number of transistors, capacitors and diodes formed upon a selectively doped and patterned substrate, such as an ultra-pure silicon or germanium wafer that is appropriately doped to produce both positive and negative semiconductor regions that form the transistors. In order to increase the number of memory components on a single substrate, the size of each transistor is preferably decreased. With today's ultrafine geometries (less than one micrometer), the bi-stable base regions of the transistors can be made very small and are therefore sensitive to radiation. Since the radiation sensitive memory device 36 does not include a package, a coating or the like to protect the memory device from radiation, radiation incident upon the radiation sensitive memory device 36 can produce charges that result in single event errors or soft errors that alter the data stored by the radiation sensitive memory device 36. Thus, an exposed digital data stream 40 is output by the radiation sensitive memory device 36 which differs from the digital data 34 input into the radiation sensitive memory device 36 if the radiation sensitive memory device has been exposed to any radiation while the digital data is stored therein.

The sensitivity of the radiation sensitive memory device 36 is typically related to the digital bit storage capacity because memory devices with larger capacities generally have greater surface areas upon which radiation can impinge. Many radiation sensitive memory devices 36 are available, however, with at least 64K memory capacity. In addition, PMOS and NMOS memory devices typically exhibit greater sensitivity to radiation than BiMOS (12L/CMOS), bipolar, CMOS, GaAs, 12L, or SOS memory devices. As such, the radiation sensitive memory device 36 can be designed or selected to have the sensitivity to radiation that is desired for the particular application.

In contrast to the radiation sensitive memory device 36 that is designed to be susceptible to radiation, the radiation hardened memory device 38 is insensitive to radiation, at least up to a predetermined level such as 1.0E6 rads. As such, radiation up to the predetermined level that is incident upon the radiation hardened memory device 38 will not alter the digital data stored by the radiation hardened memory device 38. Radiation hardened memory devices 38 are available from a number of suppliers, many of whom have designed radiation hardened memory devices for use in satellites that must operate in the high radiation environment near the Van-Allen belt around the earth. Thus, the digital data that is stored and subsequently output by the radiation hardened memory device 38 serves as a test digital data stream 42 since the digital data 34 is unchanged from when the digital data was input into the radiation hardened memory device 38, even though the radiation hardened memory device may have been exposed to radiation. Preferably, the test digital data stream 42 is output by the radiation hardened memory device 38 in synchronization with the output of the exposed digital data stream 40 by the radiation sensitive memory device 36 such that corresponding bits of the digital data 34 enter and are output by both memory devices 36, 38 at the same time. In one embodiment, for example, the radiation sensitive memory device and the radiation hardened memory device are respective shift registers into which corresponding bits of digital data are clocked or shifted.

Both the exposed digital data stream 40 and the test digital data stream 42 are input into a comparator 44. The comparator 44 compares the exposed digital data stream 40 and the test digital data stream 42 and determines whether the respective bits are the same or different. According to the present invention, differences between respective bits of the exposed digital data stream 40 and the test digital data stream 42 indicate that the radiation sensitive memory device 36 was subjected to radiation while the digital data was stored therein.

The radiation detector can also include a bit error rate counter 45 that counts the number of bit errors between the exposed and test digital data streams. Preferably, the bit error rate counter counts the number of bit errors between exposed and test digital data streams of a predetermined length, such as the bit errors within a digital word, prior to being reset and then counting the bit errors between the next pair of exposed and test digital data streams. The bit error rate counter can therefore determine a bit error rate indicative of the number of bit errors between the exposed and test digital data streams per unit time. Preferably, the comparator 44 and the bit error rate counter compares the exposed and test digital data streams one bit at a time over a span of many bits so that a slip error or a missing clock bit as well as a 0 to 1 or a 1 to 0 error in the digital data streams can be detected. Although FIG. 1 depicts the comparator and the bit error rate counter as separate elements, the comparator can be designed to include the bit error rate counter, if so desired.

The bit error rate 46 is proportional to the level of radiation incident upon the radiation sensitive memory device 36 with more bit errors indicating more exposure to radiation. As such, the radiation detector 30 can also include a controller 48 that receives the bit error rate 46 and can convert the bit error rate to a radiation exposure measurement 50 based upon a predetermined table or formula that correlates the bit error rate to a radiation exposure measurement 50. Typically, the predetermined table or formula is established in advance by experimentation or the like. The controller is typically comprised of a digital microprocessor, although the controller can be comprised of a microcontroller or the like. Moreover, in one advantageous embodiment depicted in FIG. 1, the controller, the digital data generator, the radiation hardened memory device, the comparator and the bit error rate counter can all be embodied in a digital processor.

The radiation exposure measurement 50 can be displayed on a display 52, such as a liquid crystal display ("LCD"), and/or stored in another memory device for subsequent review. Also, if a pre-set radiation exposure measurement threshold level is surpassed, an alarm 54 can be activated. The alarm 54 can be audible and/or visual. Moreover, multiple pre-set radiation exposure measurement thresholds may be established such that the alarm 54 provides different types of warnings as different radiation exposure measurement thresholds are passed. Although the interconnections are not depicted in FIG. 1 for sake of clarity, the radiation detector also includes a power supply 55 for powering the various components. In order to minimize the size and expense of the radiation detector, the power supply is typically a small replaceable battery.

As mentioned above, the operation of the radiation detector 30 is preferably synchronized. As such, the radiation detector 30 preferably includes a clock 56. Although FIG. 1 has been simplified for the purposes of illustration so as only to depict the clock providing signals to the controller 48, the clock typically provides signal to and controls the rate at which a number of the components such as the digital data generator 32, memory devices 36, 38, comparator 44 and bit error rate counter 45 operate, either directly or indirectly. Generally, higher speeds result in higher sensitivity because the charge per unit bit in the memory devices will be the least. Thus, the speed of the clock 56 may be adjusted to vary the sensitivity and resolution of the radiation detector 30.

Figure 2:
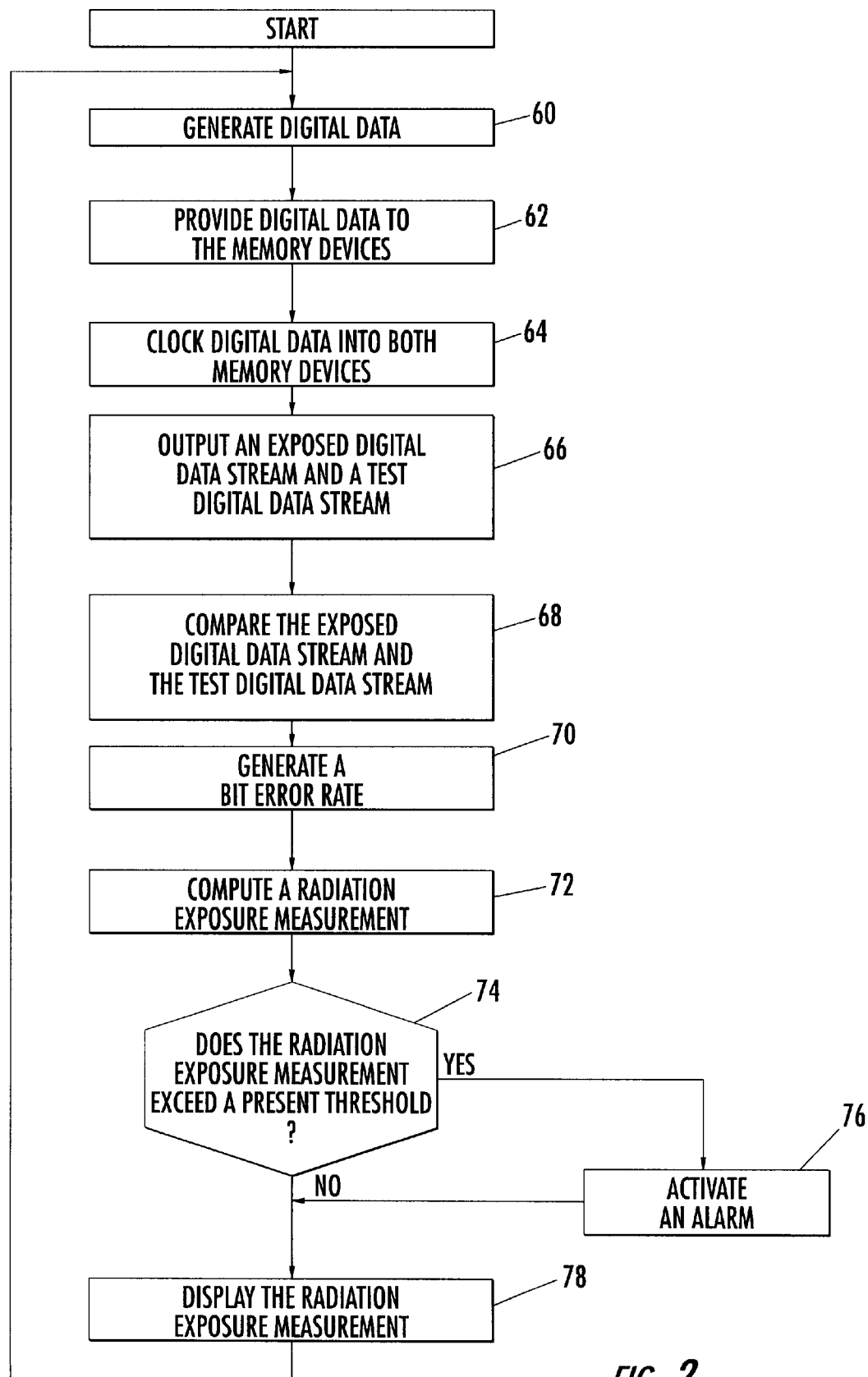
FIG. 2 is a block diagram of the operations performed by the method and apparatus of one embodiment of the present invention.

The operation of one advantageous embodiment of the radiation detector 30 is depicted in FIG. 2. Initially, digital data, such as a pseudo-random digital word, is generated as shown in block 60. Typically, the bit stream is generated by a digital data generator, such as a pseudo-random word generator that generates pseudo-random packets of digital words.

The digital data is then provided, as shown in block 62, to the memory devices, such as shift registers in this example. In the next block 64, the digital data is clocked or shifted into both a radiation sensitive memory device and a radiation hardened memory device. The same digital data is sent to both memory devices simultaneously for storage for a given period of time by both memory devices preferably in a simultaneous or synchronized manner. See block 66. Following storage for the given period of time, the exposed and test digital data streams are output.

The exposed digital data stream that is output by the radiation sensitive memory device is then compared with the test digital data stream that is output by the radiation hardened memory device as shown in block 68. As described, the radiation detector can include a bit error rate counter for comparing the exposed digital data stream with the test digital data stream bit-by-bit over a span of many bits, such as over the span of a pseudo-random digital word. Significantly, any detected differences between the exposed and test digital data streams are assumed to be the product of errors introduced by the radiation to which the radiation sensitive memory device was exposed. Thus, a high number of detected differences corresponds to exposure to larger amounts of radiation, and visa versa.

Next, as depicted in block 70, a bit error rate may be produced by counting the number of detected bit errors between the exposed digital data stream and the test digital data stream per unit time. A controller can then process this bit error rate and, as depicted in block 72, compute a radiation exposure measurement. The bit error rate will be proportional to the level of radiation incident upon the radiation sensitive memory device. Nonetheless, it will be obvious to one skilled in the art that some calibration of the equipment necessary to practice the method of the present invention will generally be necessary to accurately convert the bit error rate into a corresponding radiation exposure measurement.

The method of the present invention next determines whether the radiation exposure measurement has exceeded a pre-set radiation exposure measurement threshold as shown in block 74. If the pre-set radiation exposure measurement threshold has been surpassed, then an audible and/or visual alarm may be activated. See block 76. If, on the other hand, the pre-set radiation exposure measurement threshold has not been surpassed, no audible or visual alarm will be activated. An alternative embodiment of the radiation detection method may include multiple pre-set radiation exposure measurement thresholds. Accordingly, different audio or visual alarms may be triggered at different pre-set radiation exposure measurement thresholds. Other variations in the types of alarms and warnings may readily be conceived by those skilled in the art.

The method of the present invention can also display the radiation exposure measurement. See block 78. For example, one radiation exposure measurement can be displayed upon a liquid crystal display ("LCD") display. Alternatively, an analog meter display may be used in combination with a digital-to-analog converter to display the radiation exposure measurement.

The steps of the method of the present invention are generally repeated. Thus, digital data, such as a pseudo-random word, is being repeatedly sent to the memory devices, and the exposed digital data stream and the test digital data stream are continuously being compared to determine the level of radiation to which the radiation detector is presently being exposed. Alternatively, the radiation detection method can be conducted on a periodic basis if continuous monitoring is not desired.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A radiation detector for monitoring radiation exposure, comprising:

a pseudo-random word generator for producing pseudo-random digital words;

a radiation sensitive memory device into which a digital word produced by the pseudo-random word generator is clocked and stored for a test period during which time the digital word may be susceptible to radiation, and thereafter producing an exposed digital word;

a radiation hardened memory device into which the digital word produced by the pseudo-random word generator is clocked and stored, and for producing a test digital word which is synchronized to the exposed digital word produced by the radiation sensitive memory device;

a comparator for comparing the exposed digital word and the test digital word; and a bit error rate counter, responsive to said comparator, for measuring a bit error rate between the exposed digital word and the test digital word.

2. The radiation detector of claim 1 further comprising a controller which receives the bit error rate from the bit error rate counter and processes the bit error rate into a radiation exposure measurement.

3. The radiation detector of claim 1 further comprising a clock for controlling a rate at which the digital data generator, the comparator and the bit error rate counter operate.

4. The radiation detector of claim 2 further comprising a display for displaying the radiation exposure measurement.

5. The radiation detector of claim 2 further comprising an alarm which activates when the radiation exposure measurement exceeds a pre-set radiation exposure measurement threshold.

6. A radiation detector for monitoring radiation exposure, comprising:

a digital data generator for producing digital data;

a radiation sensitive memory device into which at least a portion of the digital data produced by the digital data generator is clocked and stored during a test period in which time the digital data may be susceptible to radiation, and thereafter producing an exposed digital data stream;

a radiation hardened memory device into which at least a portion of the digital data produced by the digital data generator is clocked and stored, and for producing a test digital data stream which is synchronized to the exposed digital data stream produced by the radiation sensitive memory device; and a comparator for comparing the exposed digital data stream with the test digital data stream to determine any differences there between.

7. The radiation detector of claim 6 wherein the digital data generator is a pseudo-random generator.

8. The radiation detector of claim 7 wherein the pseudo-random generator is a pseudo-random word generator that generates packets of digital words.

9. The radiation detector of claim 6 further comprising a clock for controlling a rate at which the digital data generator and the comparator operate.

10. The radiation detector of claim 6 further comprising a bit error rate counter, responsive to the comparator, for measuring a bit error rate between the exposed digital data stream and the test digital data stream.

11. The radiation detector of claim 10 further comprising a controller which receives the bit error rate from the bit error rate counter and processes the bit error rate into a radiation exposure measurement.

12. The radiation detector of claim 11 further comprising a display for displaying the radiation exposure measurement.

13. The radiation detector of claim 11 further comprising an alarm which activates when the radiation exposure measurement exceeds a pre-set radiation exposure measurement threshold.

14. A method of measuring radiation, comprising the steps of:

generating digital data;

clocking at least a portion of the digital data into a radiation sensitive memory device for storage during a test period during which time the digital data may be susceptible to radiation, and thereafter producing an exposed digital data stream;

concurrently clocking at least a portion of the digital data into a radiation hardened memory device for storage therein and thereafter producing a test digital data stream which is synchronized to the exposed digital data stream produced by the radiation sensitive memory device; and comparing the exposed digital data stream and the test digital data stream to determine any differences there between.

15. The method of claim 14 wherein said generating step comprises generating pseudo-random digital data.

16. The method of claim 15 wherein said generating step comprises generating pseudo-random packets of digital words.

17. The method of claim 14 further comprising the step of controllably clocking the generation of the digital data and the comparison of the exposed digital data stream and the test digital data stream.

18. The method of claim 14 further comprising the steps of:

determining an error rate by comparing the differences between the exposed digital data stream and the test digital data stream; and processing the error rate to produce a radiation exposure measurement.

19. The method of claim 18 further comprising the step of displaying the radiation exposure measurement.

20. The method of claim 18 further comprising the step of activating an alarm if the radiation exposure measurement exceeds a pre-set radiation exposure measurement threshold.

* * * * *